United States Patent
Sander et al.

(10) Patent No.: US 10,100,728 B2
(45) Date of Patent: Oct. 16, 2018

(54) METHOD FOR OPERATING A GAS TURBINE POWER PLANT WITH FLUE GAS RECIRCULATION

(71) Applicant: Ansaldo Energia Switzerland AG, Baden (CH)

(72) Inventors: Frank Sander, Rieden (CH); Stefan Rofka, Nussbaumen (DE); Eribert Benz, Birmenstorf (CH)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 1071 days.

(21) Appl. No.: 13/646,034

(22) Filed: Oct. 5, 2012

(65) Prior Publication Data
US 2013/0086883 A1    Apr. 11, 2013

(30) Foreign Application Priority Data
Oct. 6, 2011 (EP) .................................. 11184063

(51) Int. Cl.
*F02C 3/34* (2006.01)
*F02C 9/20* (2006.01)

(52) U.S. Cl.
CPC .................. *F02C 3/34* (2013.01); *F02C 9/20* (2013.01); *Y02E 20/16* (2013.01)

(58) Field of Classification Search
CPC ...... F02C 3/34; F02C 9/20; F02C 9/00; F02C 9/16; F02C 9/50; F23C 2202/00; F23C 2202/30; F23C 2202/50; F23C 7/006
See application file for complete search history.

(56) References Cited

U.S. PATENT DOCUMENTS

| | | | | |
|---|---|---|---|---|
| 3,891,915 A | * | 6/1975 | Yannone | F02C 7/26 290/2 |
| 4,028,884 A | * | 6/1977 | Martz | F01K 23/108 60/39.182 |
| 4,252,498 A | * | 2/1981 | Radcliffe | F04D 27/0246 415/26 |

(Continued)

FOREIGN PATENT DOCUMENTS

DE    10 2009 003 481 A1    8/2009
EP         0718470 A2       6/1996
(Continued)

OTHER PUBLICATIONS

European Search Report dated Feb. 27, 2012, for European Application No. 11184063.3.

(Continued)

*Primary Examiner* — William H Rodriguez
*Assistant Examiner* — Jason H Duger
(74) *Attorney, Agent, or Firm* — Buchanan Ingersoll & Rooney PC (57) ABSTRACT

A method and system are disclosed for operating a gas turbine power plant with flue gas recirculation, in which variable compressor inlet guide vanes are controlled as a function of flue gas recirculation ratio and/or as a function of a process parameter which is indicative for the flue gas recirculation. A controller setpoint position of the variable compressor inlet guide vanes can be controlled as a function of a position of a control element for controlling flue gas recirculation flow.

16 Claims, 5 Drawing Sheets

(56) References Cited

U.S. PATENT DOCUMENTS

| | | | |
|---|---|---|---|
| 4,271,664 A * | 6/1981 | Earnest | F01K 23/10 60/39.181 |
| 5,634,327 A | 6/1997 | Kamber et al. | |
| 6,202,400 B1 * | 3/2001 | Utamura | F01K 23/101 60/39.24 |
| 7,536,252 B1 * | 5/2009 | Hibshman, II | F02C 3/34 60/605.2 |
| 8,448,418 B2 * | 5/2013 | Ouellet | F02C 3/34 60/39.5 |
| 9,127,598 B2 * | 9/2015 | Snook | F01D 13/02 |
| 2007/0034171 A1 * | 2/2007 | Griffin | F01K 21/047 122/479.1 |
| 2010/0115960 A1 | 5/2010 | Brautsch et al. | |
| 2011/0037276 A1 * | 2/2011 | Hoffmann | F02C 9/22 290/40 C |
| 2011/0197593 A1 | 8/2011 | Fuchs et al. | |
| 2011/0289898 A1 * | 12/2011 | Hellat | F01K 23/10 60/39.52 |
| 2011/0289899 A1 | 12/2011 | De La Cruz Garcia et al. | |
| 2011/0302922 A1 | 12/2011 | Li et al. | |
| 2012/0186268 A1 | 7/2012 | Rofka et al. | |

FOREIGN PATENT DOCUMENTS

| | | | |
|---|---|---|---|
| EP | 2248999 A1 | 11/2010 | |
| JP | 2011-247264 A | 12/2011 | |
| JP | 2011-247265 A | 12/2011 | |
| JP | 2012-154330 A | 8/2012 | |
| WO | 2010/072710 A2 | 7/2010 | |
| WO | WO 2010072710 A2 * | 7/2010 | F01K 23/101 |
| WO | 2011/026732 A1 | 3/2011 | |

OTHER PUBLICATIONS

Office Action (Notification of Reasons for Refusal) dated Oct. 6, 2014, by the Japanese Patent Office in corresponding Japanese Patent Application No. 2012-221867, and an English translation of the Office Action. (12 pages).

German Office Action dated May 16, 2013, issued by the German Patent Office in corresponding German Patent Application No. 10 2012 019 354.8. (5 pages).

* cited by examiner

METHOD FOR OPERATING A GAS TURBINE POWER PLANT WITH FLUE GAS RECIRCULATION

RELATED APPLICATION

This application claims priority under 35 U.S.C. § 119 to European Patent Application No. 11184063.3 filed in Europe on Oct. 6, 2011, the entire content of which is hereby incorporated by reference in its entirety.

FIELD

A method is disclosed for operating a gas turbine power plant with flue gas recirculation, as is a gas turbine power plant for implementing the method.

BACKGROUND INFORMATION

The recirculation of flue gases is a technology which can be used for diverse purposes in gas turbines. Flue gas recirculation is proposed, for example, for reduction of NOx emissions (nitrogen oxide emissions which are produced during combustion) or for a reduction of the flue gas flow which is to be discharged. During the recirculation of flue gases in a gas turbine, an essential proportion of the flue gas is branched from the overall flue gas flow and, after being cooled and scrubbed, can be fed to the intake mass flow of the gas turbine or to the compressor, wherein the recirculated flue gas flow is mixed with fresh air, and this mixture is then fed to the compressor.

As a result of flue gas recirculation, the carbon dioxide partial pressure in the flue gases can advantageously be increased in order to increase the carbon dioxide concentration in the flue gases and therefore to reduce the power losses and efficiency losses of power plants with carbon dioxide separation. In addition, flue gas recirculation has been proposed for reducing the oxygen concentration in the intake gases of gas turbines in order to reduce the NOx emissions.

For flue gas recirculation, U.S. Pat. No. 7,536,252 B1, for example, describes a method for controlling a flue gas recirculation flow of a turbomachine, which is recirculated, via a flue gas recirculation system, to the intake of the turbomachine. In this method, a setpoint flue gas recirculation ratio is determined, wherein the flue gas recirculation ratio is defined as a ratio of the recirculated flue gas flow to the intake flow of the turbomachine, and the actual value is adjusted to the setpoint value.

By activating flue gas recirculation or by altering the flue gas recirculation flow, the boundary conditions for operating the gas turbine are changed so that the power plant no longer demonstrates the anticipated performance or no longer achieves the anticipated power and efficiency targets when using a known operating concept, as is known from EP0718470, for example.

SUMMARY

A method is disclosed for operating a gas turbine power plant having a gas turbine with a combustion chamber and turbine, a heat recovery steam generator, and a flue gas recirculation cooler with flue gas recirculation, which method comprises: splitting flue gases via a flue gas splitter of the gas turbine power plant into a first flue gas flow for recirculation into an intake flow of the gas turbine and into a second flue gas flow for discharging to an environment of the gas power plant; controlling the first flue gas flow; and controlling variable compressor inlet guide vanes of a compressor in the gas turbine as a function of a process parameter which is indicative for the flue gas recirculation.

A gas turbine power plant is also disclosed with flue gas recirculation, comprising: a gas turbine with a compressor; variable compressor inlet guide vanes; a combustion chamber; a turbine; a controller; a heat recovery steam generator; a flue gas splitter for splitting flue gases into a first flue gas flow for recirculation into an intake flow of the gas turbine, and into a second flue gas flow for discharging to an environment of the gas turbine power plant; and a control element for controlling the first flue gas flow wherein the controller is configured so that a setpoint position of the variable compressor inlet guide vanes is controlled as a function of a position of the control element.

BRIEF DESCRIPTION OF THE DRAWINGS

Exemplary embodiments are described in the following text with reference to the drawings which serve purely for explanation and are not to be construed as being limiting. In the drawings, by way of example.

DETAILED DESCRIPTION

The present disclosure includes a method for reliable operation of a gas turbine power plant, in which method the influence of flue gas recirculation on the performance, that is to say by the output and/or by the efficiency, is at least partially compensated.

A gas turbine power plant with flue gas recirculation can comprise a gas turbine, a heat recovery steam generator, a flue gas splitter, which splits the flue gases of the gas turbine power plant into a first flue gas flow for recirculation into an intake flow of the gas turbine and into a second flue gas flow for discharging to the environment, and a flue gas recirculation cooler. The gas turbine itself comprises a compressor with variable compressor inlet guide vanes, a combustion chamber, and a turbine. In addition, the flue gas splitter is designed as a control element for controlling the first flue gas flow, or provision is made for a control element in a recirculation line by means of which the recirculated flue gases are fed to the compressor of the gas turbine.

According to an exemplary embodiment of the method for operating a gas turbine power plant, the variable compressor inlet guide vanes are controlled as a function of the flue gas recirculation ratio (also referred to as the flue gas recirculation proportion) and/or as a function of a process parameter of the power plant which is indicative for the flue gas recirculation. In this case, for example, the variable compressor inlet guide vanes are opened wider with increasing recirculation ratio (e.g., with the ratio of recirculated flue gas flow to overall flue gas flow becoming greater). A parameter, on the basis of the value of which, or change of value of which, alone or in combination with other parameters, the recirculation flow or the recirculation ratio can be at least qualitatively identified or derived, is to be understood as an indicative process parameter. An indicative process parameter can allow even a qualitative derivation of the recirculation flow or of the recirculation ratio.

Depending upon the embodiment, the controlling of the variable compressor inlet guide vanes can be integrated into the logic of a controller, or of the control algorithm, as a function of the flue gas recirculation ratio and/or as a function of a process parameter of the power plant which is indicative for the flue gas recirculation. It can also be calculated as a correction or offset, and therefore the setpoint variables, which influence a known gas turbine controller, are corrected.

According to an exemplary embodiment of the method, the temperature difference between compressor inlet temperature and ambient temperature is used as a parameter as a function of which the variable compressor inlet guide vanes are controlled. The compressor inlet temperature can, for example, increase with the recirculation ratio, since the recirculated flue gases are not cooled to ambient temperature. Particularly in the case of air-to-air coolers, which utilize ambient air as a heat sink, the recirculated flue gases stay warmer than the ambient air.

For optimizing the power plant process, and depending upon the availability of heat sinks, the recirculation cooling temperature, to which the recirculated flue gases are cooled in the flue gas recirculation cooler, is controlled. On the one hand, this recirculation cooling temperature can even lie below the ambient temperature if cooling water is available, for example. On the other hand, the recirculation cooling temperature can lie significantly above the ambient temperature and can be raised above the temperature which is achievable with air-to-air coolers in order to increase the efficiency of the overall power plant during partial-load operation, for example. Along with the recirculation cooling temperature, the influence of the recirculated flue gases upon the power plant process is changed, which is why in one embodiment of the method the variable compressor inlet guide vanes can be controlled as a function of the recirculation cooling temperature of the flue gas recirculation cooler.

Since the determination of the recirculation ratio is costly and often inaccurate in practice on account of the large volumetric flows which are difficult to determine, according to one embodiment of the method the variable compressor inlet guide vanes are controlled as a function of the position of the control element with which the first partial flue gas flow for recirculation is controlled. Alternatively, a correction of the setpoint position of the variable compressor inlet guide vanes can be determined in the controller as a function of the setpoint position of the control element.

According to a further exemplary embodiment, the variable compressor inlet guide vanes are opened in proportion to the flue gas recirculation ratio and/or in proportion to a process parameter which is indicative for the flue gas recirculation.

According to a further embodiment of the method, the full-load position of the variable compressor inlet guide vanes up to which the variable compressor inlet guide vanes can be opened is controlled as a function of the flue gas recirculation ratio and/or as a function of a process parameter which is indicative for the flue gas recirculation.

By controlling the variable compressor inlet guide vanes as a function of the flue gas recirculation ratio and/or as a function of a parameter which is indicative for the flue gas recirculation, a correction or an offset in the guide vane position is created compared with a known operating concept. As a result of this correction, which includes opening of the variable compressor inlet guide vanes, the intake volumetric flow of the compressor is increased. Therefore, the output of the gas turbine is increased, as a result of which the influence of the flue gas recirculation upon the power plant can be compensated. Also, the output of the waste-heat boiler and of the associated water-steam cycle is in proportion to the flue gas volume. At the same time, the pressure ratio of the gas turbine is increased with the volumetric flow. This can have a positive effect upon the efficiency of the gas turbine, but with constant hot gas temperature leads to a lowering of the flue gas temperature of the gas turbine.

On account of design limits, such as the surge limit of the compressor, the permissible compressor exit temperatures or a shift of the compressor bleed pressures for cooling air bleed, the variable compressor inlet guide vanes cannot be opened at random. According to an exemplary embodiment of the method, the variable compressor inlet guide vanes are therefore opened as a function of the flue gas recirculation ratio and/or as a function of a process parameter which is indicative for the flue gas recirculation until a limit value is reached. Even during further increase of the flue gas recirculation ratio, the correction is kept constant independently of this.

According to an exemplary embodiment of the method, the variable compressor inlet guide vanes, during changes of the flue gas recirculation ratio, are opened so that the flue gas temperature remains constant. According to a further embodiment of the method, the variable compressor inlet guide vanes, during changes of the flue gas recirculation ratio, are opened so that the flue gas temperature is kept constant until a limit value is reached. Even during further increase of the flue gas recirculation ratio, the position of the variable compressor inlet guide vanes is kept constant independently of this.

According to a further exemplary embodiment of the method, the limit value of the opening of the variable compressor inlet guide vanes is dependent upon the operating frequency and/or upon the aerodynamic rotational speed of the compressor.

The method can be implemented equally for gas turbines with one combustion chamber as for gas turbines with so-called sequential combustion (e.g., gas turbines with a first combustion chamber, a high-pressure turbine, a second combustion chamber and a low-pressure turbine).

In a further exemplary embodiment of the method for gas turbines with sequential combustion and flue gas recirculation, during start-up of the gas turbine the first combustion chamber is first of all supplied with fuel and ignited, then the second combustion chamber is supplied with fuel and ignited, and the flue gas recirculation is initiated only after activation of the second combustion chamber. Accordingly, the position of the variable compressor inlet guide vanes is also controlled only after activation of the second combustion chamber as a function of the flue gas recirculation and/or as a function of a process parameter which is indicative for the flue gas recirculation. In addition, the flue gas recirculation is closed down before deactivation of the second combustion chamber and therefore the controlling of the variable compressor inlet guide vanes is also carried out again without correction, for example, strictly according to a standard operating concept.

According to a further embodiment of the method, the flue gas is recirculated for increasing the carbon dioxide concentration. With this method, the second flue gas flow is fed to a carbon dioxide separation system. In this, carbon dioxide is separated and discharged for further processing or storage. The resulting carbon dioxide-depleted flue gas is discharged to the environment.

Depending upon the embodiment of the method, the variable compressor inlet guide vanes are controlled during partial-load operation or even during full-load operation as a function of the flue gas recirculation and/or as a function of a process parameter which is indicative for the flue gas recirculation. If controlling of the variable compressor inlet guide vanes is undertaken only during partial-load operation, compensation of the influence of the flue gas recirculation upon the gas turbine process cannot be carried out. Controlling at full load involves the gas turbine being designed for a wider opening of the variable compressor inlet guide vanes.

In addition to the method for controlling a gas turbine power plant, a gas turbine power plant with flue gas recirculation for implementing the method is disclosed. Such a gas turbine power plant comprises a gas turbine with a compressor, variable compressor inlet guide vanes, a combustion chamber, a turbine and a controller. In addition, such a gas turbine power plant comprises a heat recovery steam generator and a flue gas splitter, which splits the flue gases into a first flue gas flow for recirculation into an intake flow of the gas turbine and into a second flue gas flow for discharging to the environment, and also a control element for controlling the first flue gas flow. In this case, the controller can be configured so that a setpoint position of the variable compressor inlet guide vanes is controlled as a function of the position of the control element.

In addition, corresponding measuring sensors can be provided when controlling as a function of process parameters. For example, for controlling as a function of the temperature difference between compressor inlet temperature and ambient temperature, a measuring sensor for measuring the compressor inlet temperature and a measuring sensor for measuring the ambient temperature are to be provided.

Advantages as disclosed herein are applicable not only in the respectively disclosed combinations but also in other combinations or in isolation without departing from the scope of the invention. For example, instead of using a control element, which allows closing of the recirculation line, such as a controllable flap or a valve, a controllable flue gas blower or a booster can also be provided as a control element. For simplicity, controlling of the variable compressor inlet guide vanes has been described in general. This is representative for closed-loop controlling or open-loop controlling. Different control strategies, such as two-step controlling, controlling with a proportional controller, with an integral controller or with an IP controller, are known to those skilled in the art. In addition, different cleaning methods or processing methods for the recirculated flue gases, such as gas scrubbing, with which the recirculated flue gases can be treated before being introduced into the compressor, are known to those skilled in the art. Flue gas flow is used as a summarizing term for flue gas mass flow and flue gas volumetric flow. A control system and the corresponding method can be implemented both for the flue gas mass flow and for the flue gas volumetric flow.

Figure 1:
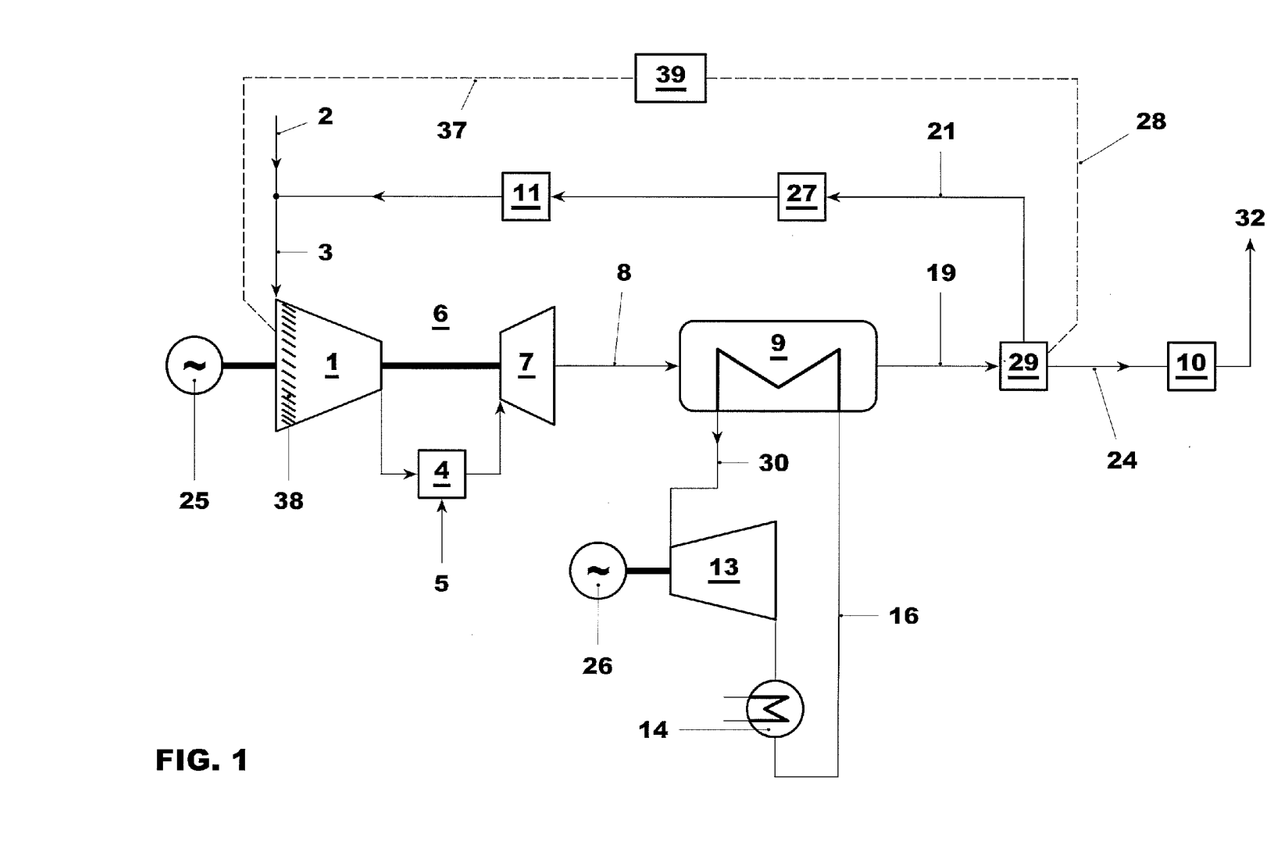
FIG. 1 shows a schematic representation of an exemplary gas turbine power plant with recirculation of the flue gases.

FIG. 1 shows in a schematic representation essential elements of an exemplary gas turbine power plant as disclosed herein. The gas turbine 6 comprises a compressor 1, the combustion air which is compressed therein being fed to a combustion chamber 4 and combusted there with fuel 5. The hot combustion gases are then expanded in a turbine 7. The useful energy which is produced in the turbine 7 is then converted into electric energy by a first generator 25, for example, which is arranged on the same shaft.

The hot flue gases 8 which issue from the turbine 7 are used for optimum utilization of the energy, still contained therein, in a heat recovery steam generator 9 (HRSG) for producing live steam 30 for a steam turbine 13 or for other plants. The useful energy which is produced in the steam turbine 13 is converted into electric energy by a second generator 26, for example, which is arranged on the same shaft. The water-steam cycle is simplified in the example and shown only schematically with a condenser 14 and feed-water line 16. Various pressure stages, feed-water pumps, etc., are not shown specifically since these are not the subject of the invention.

The flue gases 19 from the heat recovery steam generator 9 are split downstream of the heat recovery steam generator 9 in a flow splitter 29 into a first partial flue gas flow 21 and into a second partial flue gas flow 24. The first partial flue gas flow 21 is recirculated into the intake line of the gas turbine 6 and mixed with ambient air 2 there. The second partial flue gas flow 24, which is not recirculated, is discharged via an exhaust stack 32 to the environment. In order to overcome pressure losses of the flue gas line, and as a further control possibility for distribution of the flue gas flows, a flue gas blower 11 or controllable flue gas blower 11 can be optionally provided.

During operation with recirculation, the recirculated flue gas flow 21 is cooled to just above ambient temperature in a flue gas recirculation cooler 27 which can be equipped with a condenser. The booster or the flue gas blower 11 for the recirculation flow 21 can be arranged downstream of this flue gas recirculation cooler 27. The recirculated flue gas flow 21 is mixed with the ambient air 2 before the mixture is fed as intake flow via the compressor inlet 3 to the gas turbine 6.

In the depicted example, the flow splitter 29 is constructed as a control element which allows the recirculation mass flow or the recirculation ratio to be controlled. The position of the flow splitter 29 is transmitted via a signal line 28 to the controller 39. The position of the variable compressor inlet guide vanes 38 is controlled, or corrected compared with a standard operating concept, as a function of the position of the flow splitter 29. The corresponding data exchange of setpoint position and actual position of the variable compressor inlet guide vanes is carried out via the signal line 37 (all known signal lines, measuring sensors and control elements are not shown for better clarity since these are not the subject of the invention).

Figure 2:
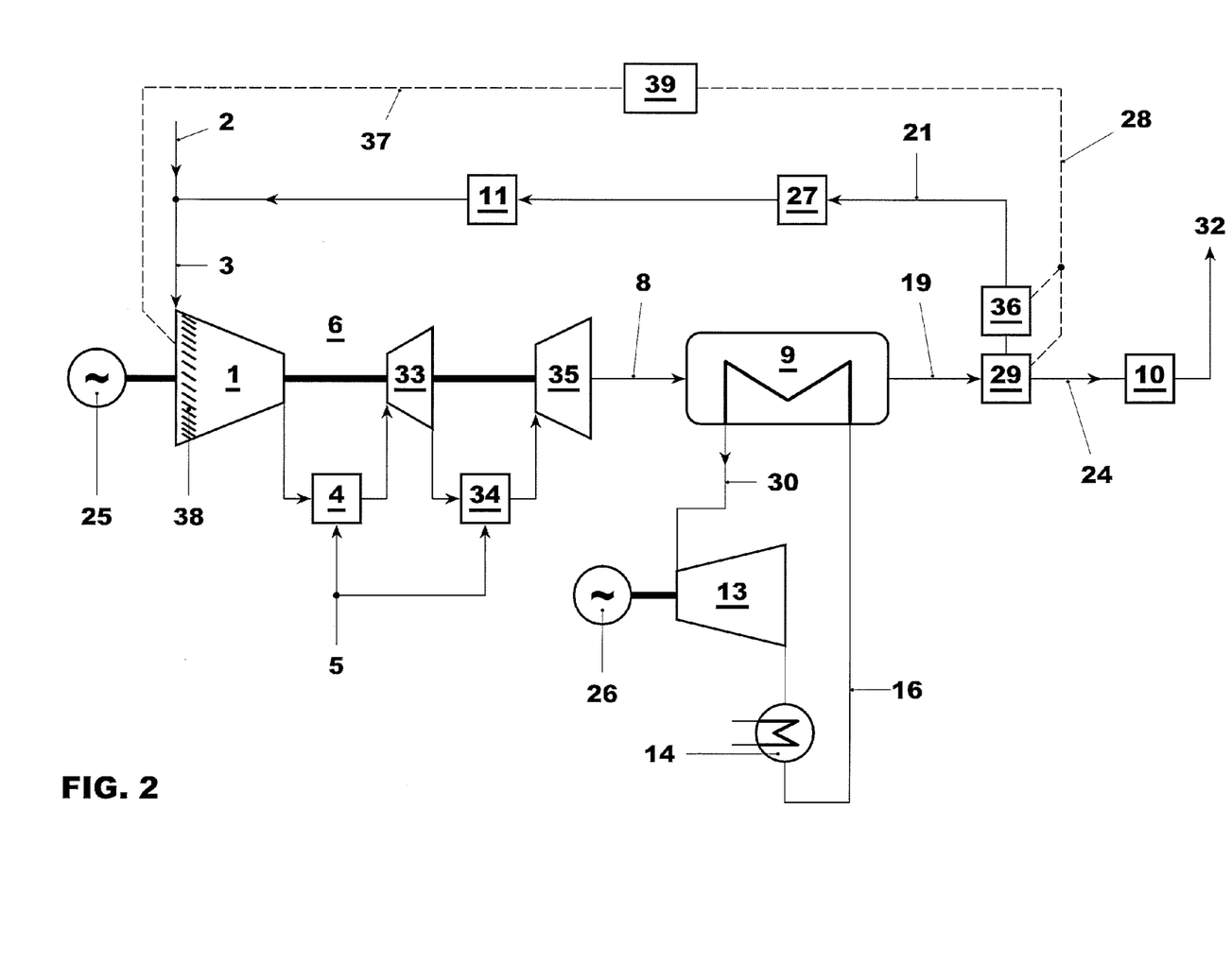
FIG. 2 shows a schematic representation of an exemplary gas turbine power plant with a gas turbine with sequential combustion and recirculation of the flue gases.

The example of FIG. 1 shows a gas turbine 6 with a single combustion chamber 4. However, features disclosed herein are also applicable without limitation for gas turbines with sequential combustion, as are known from EP0718470, for example. Schematically shown in FIG. 2 is an example of a gas turbine power plant with sequential combustion and flue gas recirculation. In this gas turbine, the first combustion chamber 4 follows a high-pressure turbine 33. To the flue gases of the high-pressure turbine 33, which are partially expanded, with the output of work, fuel 5 is once again fed and combusted in the second combustion chamber 34. The hot combustion gases of the second combustion chamber 34 are further expanded in the low-pressure turbine 35, with output of work. The utilization of the waste heat and also recirculation are carried out corresponding to the exemplary embodiment from FIG. 1. For controlling and shutting off the recirculation flow, provision is additionally made for a control element 36 in addition to the flue gas splitter 29 which can be of a non-adjustable design. This control element 36 is also connected via signal lines 28 to the controller 39.

Figure 3:
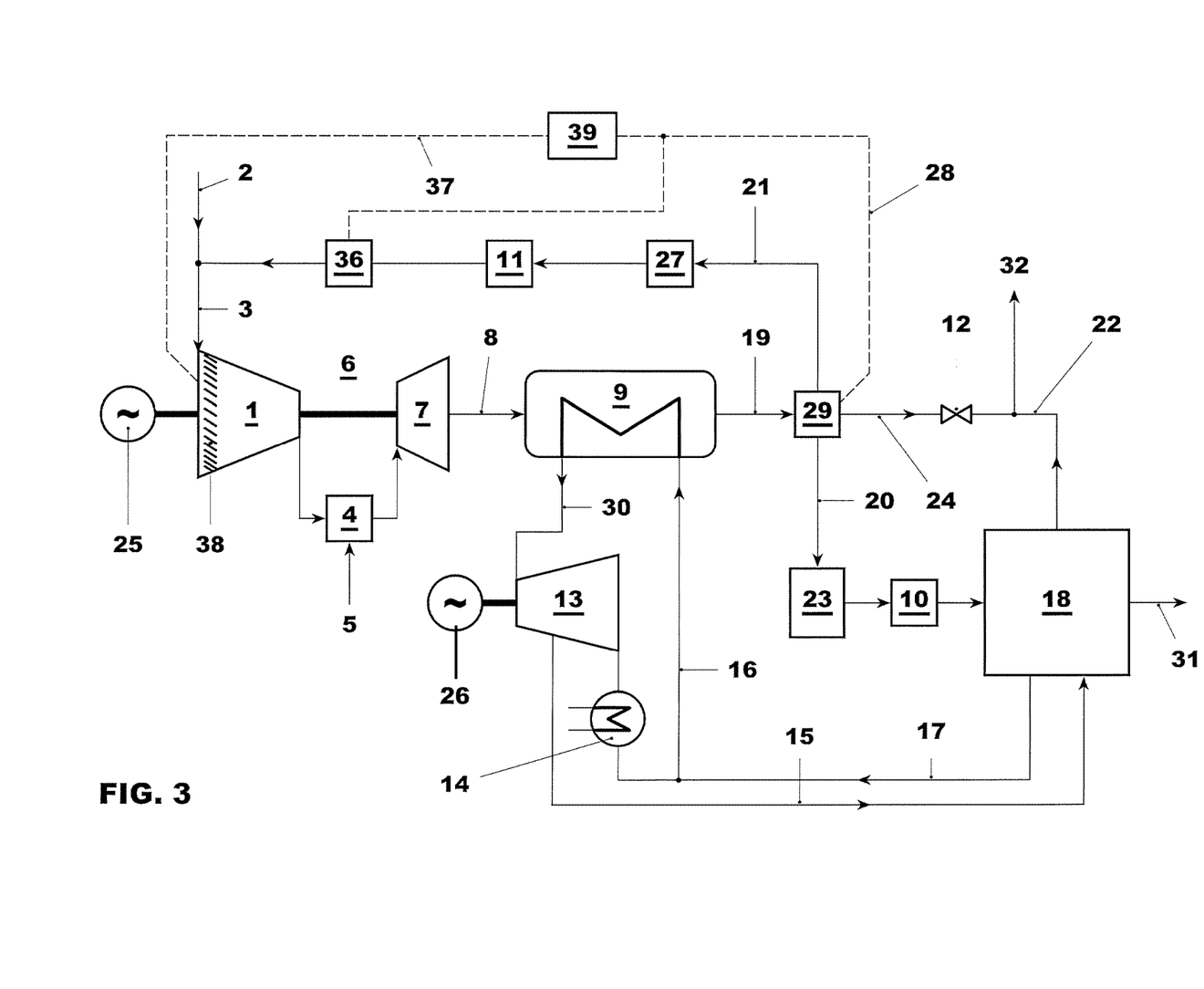
FIG. 3 a schematic representation of an exemplary gas turbine power plant with recirculation of the flue gases and a carbon dioxide separation system.

In FIG. 3, based on FIG. 1, a carbon dioxide separation system 18 is additionally shown. The non-recirculated second partial flue gas flow 20 can be additionally cooled in a flue gas recirculation cooler 23 and fed to the carbon dioxide separation system 18. From this, carbon dioxide-depleted flue gases 22 are discharged via an exhaust stack 32 to the environment. In order to overcome the pressure losses of the carbon dioxide separation system 18 and of the flue gas line, a flue gas blower 10 can be provided. The carbon dioxide 31 which is separated in the carbon dioxide separation system 18 can be compressed in a compressor (not shown) and discharged for storage or for further treatment. The carbon dioxide separation system 18 is supplied via a steam extraction line 15 with steam, such as intermediate-pressure steam or low-pressure steam which is tapped from the steam turbine 13. The steam is returned again to the water-steam cycle after releasing energy in the carbon dioxide separation system 18. In the depicted example, the steam is condensed and added to the feed water via the condensate return line 17.

The second partial flue gas flow can also be routed to the exhaust stack 32 directly via a flue gas bypass 24 which comprises a bypass flap or valve.

In addition to the exemplary embodiment which is shown in FIG. 1, the flue gas recirculation system of the example which is shown in FIG. 3 additionally comprises a separate control element 36 for controlling the recirculation flow.

Figure 4:
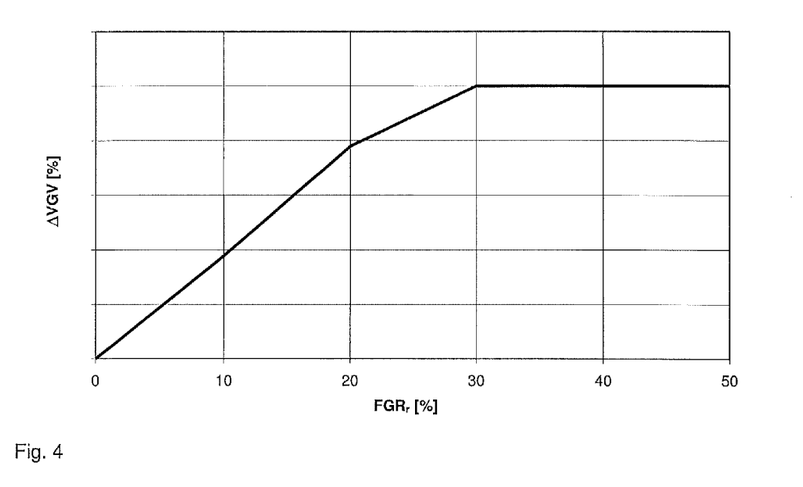
FIG. 4 schematically shows offset of an exemplary compressor inlet guide vanes as a function of the flue gas recirculation rate.

FIG. 4 schematically shows an exemplary embodiment with a correction $\Delta VGV$, or the offset of the angle of the variable compressor inlet guide vanes VGV, as a function of the flue gas recirculation rate $FRG_r$. The correction is initially proportional to the flue gas recirculation rate $FRG_r$ for a small flue gas recirculation rate $FRG_r$. After reaching a limit value of correction, which for example, lies between 5° and 15° (or lesser or greater), the correction $\Delta VGV$ remains constant independently of the flue gas recirculation rate $FRG_r$. The correction $\Delta VGV$ can be calculated in a controller as a correction value and output separately as a correction or can be integrated into the logic so that controlling is carried out directly at the corrected VGV value.

Figure 5:
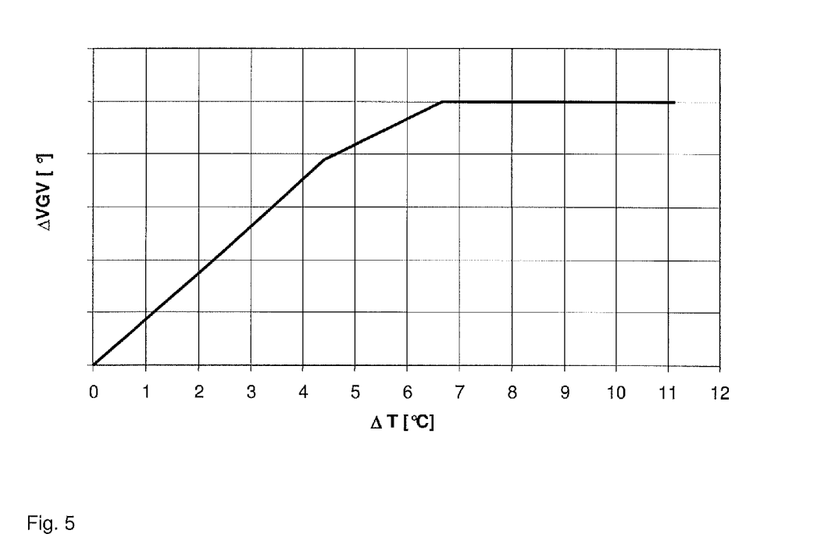
FIG. 5 schematically shows offset of an exemplary compressor inlet guide vane position as a function of the increased compressor inlet temperature compared with the ambient temperature as a result of flue gas recirculation.

FIG. 5 schematically shows a further exemplary embodiment for correction of the angle of the variable compressor inlet guide vanes $\Delta VGV$. In this example, the correction $\Delta VGV$ is dependent upon the compressor inlet temperature $\Delta T$ which is increased compared with the ambient temperature as result of flue gas recirculation. The correction $\Delta VGV$ is initially proportional to the flue gas recirculation rate for small temperature changes $\Delta T$. After achieving a limit value of correction, which for example lies between 5° and 15° (or lesser or greater), the correction $\Delta VGV$ remains constant independently of the temperature change $\Delta T$.

Figure 6:
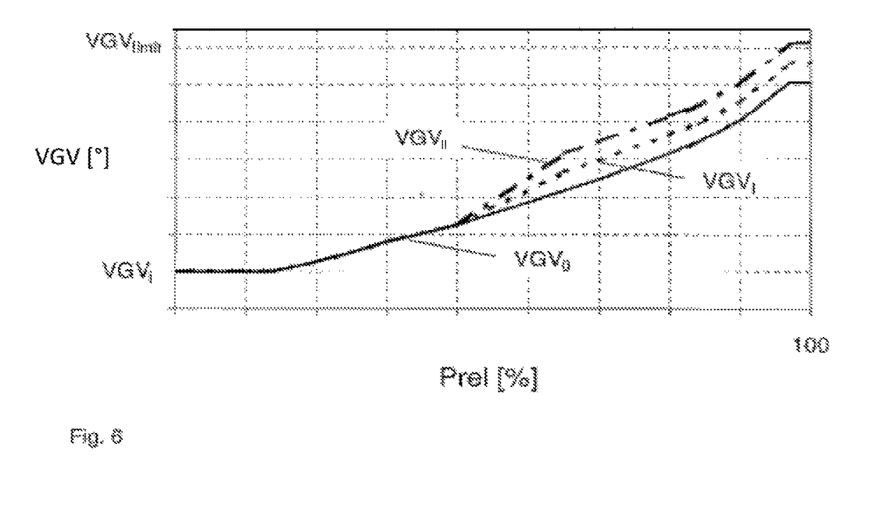
FIG. 6 schematically shows a curve of an exemplary compressor guide vane position over the relative load of the gas turbine for operation without flue gas recirculation and for operation with two different flue gas recirculation ratios.

FIG. 6 schematically shows a curve of the compressor inlet guide vane position VGV over the relative load $P_{rel}$ of the gas turbine 6. The relative load $P_{rel}$ is the output at an operating point with regard to the possible full-load output of the gas turbine 6 with the same boundary conditions. The curve is shown for three possible methods for operating the gas turbine 6. In the first example, the gas turbine 6 is operated without flue gas recirculation. The variable compressor inlet guide vanes $VGV_0$ operate according to a standard operating concept without flue gas recirculation. In second and third depicted methods, at a load point which in the depicted example lies between 40% and 60% of the relative load $P_{rel}$, the flue gas recirculation is started and the flue gas recirculation ratio is increased with the load. With increasing flue gas recirculation rate, the variable compressor inlet guide vanes VGV are opened.

In the first example for flue gas recirculation, the variable compressor inlet guide vanes VGV are opened in proportion to the flue gas recirculation ratio and therefore in proportion to the load. They are opened in proportion to the relative load until an angle $VGV_I$ of the variable compressor inlet guide vanes with the flue gas recirculation ratio I is reached.

In the second example for flue gas recirculation, the inlet guide vanes are opened in proportion to the flue gas recirculation ratio and therefore in proportion to the load until an angle $VGV_{II}$ of the variable compressor inlet guide vanes with a flue gas recirculation ratio II is achieved. This can be the maximum correction of the variable compressor inlet guide vanes VGV for flue gas recirculation, for example. In this example, the flue gas recirculation rate can be increased still further with the load, for example, without the variable compressor inlet guide vanes VGV being further corrected, since the limit for correction of the variable compressor inlet guide vanes is reached. After achieving the angle $VGV_{II}$, loading up further to full load is carried out without a further change of correction.

When loading up the gas turbine, the variable compressor inlet guide vanes VGV are opened wider until at high load a limit value $VGV_{Limit}$, which limits the maximum opening of the variable compressor inlet guide vanes VGV, is reached.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF DESIGNATIONS

1 Compressor
2 Ambient air
3 Compressor inlet
4 Combustion chamber, first combustion chamber
5 Fuel
6 Gas turbine
7 Turbine
8 Hot flue gases of the gas turbine
9 Heat recovery steam generator (HRSG)
10 Flue gas blower for the second flue gas partial flow (to the carbon dioxide separation system or exhaust stack)
11 Flue gas blower for the first flue gas partial flow (flue gas recirculation)
12 Bypass flap or valve
13 Steam turbine
14 Condenser
15 Steam extraction line for the carbon dioxide separation system
16 Feed-water line
17 Condensate return line 18 Carbon dioxide separation system
19 Flue gas from the heat recovery steam generator
20 Second flue gas partial flow (flue gas line to the carbon dioxide separation system)
21 First flue gas partial flow (flue gas recirculation)
22 Carbon dioxide-depleted flue gas
23 Flue gas recirculation cooler (for the second flue gas partial flow)
24 Flue gas bypass to the exhaust stack
25 First generator
26 Second generator
27 Flue gas recirculation cooler (for the first flue gas partial flow)
28 Signal line to the control element (29, 36)
29 Flue gas splitter
30 Live steam
31 Separated carbon dioxide
32 Exhaust stack
33 High-pressure turbine
34 Second combustion chamber
35 Low-pressure turbine
36 Control element
37 Signal line to the variable compressor inlet guide vanes
38 Variable compressor inlet guide vanes (VGV)
39 Controller
VGV Angle of the variable compressor inlet guide vanes
$VGV_i$ Angle of the variable compressor inlet guide vanes at no-load (idle)
$VGV_{limit}$ Limit value for the maximum opening of the variable compressor inlet guide vanes
$VGV_0$ Angle of the variable compressor inlet guide vanes without flue gas recirculation
$VGV_I$ Angle of the variable compressor inlet guide vanes with flue gas recirculation ratio I
$VGV_{II}$ Angle of the variable compressor inlet guide vanes with flue gas recirculation ratio II
VGV Change of the angle of the variable compressor inlet guide vanes compared with operation without flue gas recirculation
T Increase of the compressor inlet temperature compared with the ambient temperature

The invention claimed is:

1. A method for operating a gas turbine power plant having a gas turbine with a combustion chamber and turbine, a heat recovery steam generator, and a flue gas recirculation cooler with flue gas recirculation, which method comprises:
    splitting flue gases via a flue gas splitter of the gas turbine power plant into a first flue gas flow for recirculation into an intake flow of the gas turbine and into a second flue gas flow for discharging to the environment of the gas turbine power plant;
    controlling the first flue gas flow; and
    controlling variable compressor inlet guide vanes of a compressor in the gas turbine in proportion to a flue gas recirculation rate of the first flue gas flow, and wherein the controlling of the variable compressor inlet guide vanes includes controlling an opening angle of the variable compressor inlet guide vanes by applying a correction angle to a first angle, wherein the first angle is determined form relative load of the gas turbine, and the correction angle is proportional to the flue gas recirculation rate of the first flue gas flow, and after achieving a predetermined limit of the correction angle of the variable compressor inlet guide vanes as the flue gas recirculation rate of the first flue gas flow increases and prior to reaching a maximum value of the opening angle, the correction angle of the variable compressor inlet guide vanes remains constant independent of the flue gas recirculation rate of the first flue gas flow.

2. The method as claimed in claim 1, comprising:
    controlling the first flue gas flow as a function of a position of the flue gas splitter.

3. The method as claimed in claim 1, comprising:
    increasing the opening angle in proportion to the flue gas recirculation rate of the first flue gas flow as the flue gas recirculation rate of the first flue gas flow increases prior to achieving the predetermined limit of the correction angle.

4. The method as claimed in claim 1, wherein the predetermined limit of the correction angle of the variable compressor inlet vanes is dependent upon an operating frequency and/or of an aerodynamic rotational speed of the compressor.

5. The method as claimed in claim 1, wherein the combustion chamber is a first combustion chamber, and wherein the gas turbine includes a second combustion chamber, the method further comprising:
    during start-up of the gas turbine, supplying the first combustion chamber with fuel and initiating the splitting of the flue gases after activation of the second combustion chamber; and
    deactivating the splitting of the flue gases before deactivation of the second combustion chamber.

6. The method as claimed in claim 1, comprising:
    feeding the second flue gas flow to a carbon dioxide separation system;
    discharging separated carbon dioxide from the carbon dioxide separation system for further processing or storage such that the second flue gas flow is carbon-dioxide depleted; and
    discharging the second flue gas flow that is carbon dioxide-depleted to the environment of the gas turbine power plant.

7. The method as claimed in claim 1, wherein the gas turbine power plant includes a controller, the method further comprising:
    controlling the first flue gas flow as a function of a position of the flue gas splitter with the controller.

8. The method as claimed in claim 7, wherein the flue gas recirculation rate of the first flue gas flow is a flue gas recirculation ratio, and wherein the flue gas recirculation ration is a ratio of a recirculation flue gas flow of the first flue gas flow to an overall flue gas flow of the first flue gas flow and the second flue gas flow.

9. The method as claimed in claim 8, wherein a flue gas temperature is kept constant during a change of the flue gas recirculation ratio.

10. The method as claimed in claim 8, comprising:
    opening the variable compressor inlet guide vanes to the maximum value after achieving the predetermined limit of the correction angle.

11. The method as claimed in claim 1, wherein the predetermined limit of the correction angle of the variable compressor inlet guide vanes is between 5 and 15 degrees.

12. The method as claimed in claim 1, wherein the flue gas recirculation rate of the first flue gas flow is a flue gas recirculation ration, and wherein the flue gas recirculation ratio is a ratio of a recirculated flue gas flow of the first flue gas flow to an overall flue gas flow of the first flue gas flow and the second flue gas flow.

13. The method as claimed in claim 1, wherein the flue gas recirculation rate of the first flue gas flow is indicative of the flue gas recirculation.

14. The method as claimed in claim 1, further comprising: starting the splitting of the flue gases via the flue gas splitter of the gas turbine power plant into the first flue gas flow for recirculation into the intake flow of the gas turbine at 40% to 60% of the relative load of the gas turbine.

15. The method as claimed in claim 1, further comprising: increasing the relative load of the gas turbine to full load with the correction angle of the variable compressor inlet guide vanes remaining constant independent of the flue gas recirculation rate of the first flue gas flow after the achieving of the predetermined limit of the correction angle of the variable compressor inlet guide vanes.

16. The method as claimed in claim 1, further comprising: increasing the flue gas recirculation rate of the first flue gas flow as the relative load of the gas turbine increases.

* * * * *